UNITED STATES PATENT OFFICE.

LOUIS E. BARTON, OF NIAGARA FALLS, NEW YORK, AND HENRY A. GARDNER, OF WASHINGTON, DISTRICT OF COLUMBIA, ASSIGNORS TO THE TITANIUM ALLOY MANUFACTURING COMPANY, OF NEW YORK, N. Y., A CORPORATION OF MAINE.

PRINTERS' INKS AND COLORING-MATTERS AND PROCEDURE WHEREBY THE SAME ARE PRODUCIBLE.

1,283,455.  Specification of Letters Patent.  Patented Nov. 5, 1918.

No Drawing.  Application filed November 28, 1917. Serial No. 204,381.

*To all whom it may concern:*

Be it known that we, LOUIS E. BARTON and HENRY A. GARDNER, both citizens of the United States, and residents, respectively, of Niagara Falls, in the county of Niagara and State of New York, and Washington, in the District of Columbia, have invented certain new and useful Improvements in Printers' Inks and Coloring-Matters and a Procedure Whereby the Same are Producible, of which the following is a specification.

The invention relates to those compositions, including inks and printers' "colors," so called, which are, by reason of their peculiar consistency, printable, i. e. applicable to types and therefrom transferable by printing to another surface, and its objects comprise provision of expedients whereby such compositions are producible more efficiently and economically and of better qualities than heretofore, including opacity, durability, workability, intensity, etc.

Our invention is based upon our discovery that titanic oxid ($TiO_2$) possesses peculiar qualities and characteristics, which enable us to attain our said objects through incorporations thereof, in suitable condition, and substantial quantity, with the other usual ingredients of said printable compositions, including inks and colors. For example, that the exceptionally refractory character of that oxid imparts durability to the coloration of the print; its high refractive index exceptionally increases its opacity; its fineness and smoothness, when suitably prepared, facilitate its incorporation with the other constituents of the printers' ink or color compositions and correspondingly improves the appearance of the products printed therefrom; and its unique chemical properties and affinities insure an exceptionally perfect distribution, or homogeneity, in the organic and other constituents of the said printable compositions, "colors," inks, etc. containing it.

The following example will illustrate how our invention is preferably practised and novel titaniferous inks, or other printers' colors, obtained.

A. We place in any suitable vat a quantity, such as indicated, of an organic coloring matter, precipitable by barium chlorid, for example ponceau 3R. This we dissolve in water. We then add dry sodium sulfate and stir the mass until solution is complete. In another vat, preferably arranged below the first, we place a quantity, such as indicated by the product desired, of titanic oxid $TiO_2$, preferably in the form of what is known as a "composite titanic oxid pigment" consisting approximately of twenty parts $TiO_2$ and eighty parts $CaSO_4$. To this we add sufficient barium chlorid to precipitate, during the next step, the organic coloring matter referred to. We then slowly run the said contents of the upper into the lower vat, and in the latter agitate the charge and maintain it at the temperature indicated for the most complete reaction and precipitation. The resulting precipitate of organic matter in conjunction with the titanic oxid, the white calcium sulfate base, and also the barium sulfate that has been precipitated, will, in this instance, be a lake, available as a pigment, of a beautiful red color, the hue and tone of which, as well as certain of its physical characteristics, may be controlled, as will be apparent to those skilled in the art, by correspondingly varying the proportions of the ingredients, the strength of the solution, the temperature, the rapidity of the precipitation, etc. We then wash and dry our resulting lake, or pigment, precipitate, and incorporate it at any preferred stage and in any preferred manner, or extent, with other usual constituents of the printable inks, or colors, including a suitable vehicle, such as linseed, or rosin, oil, thus producing our novel titaniferous products of the class described.

B. As an alternative, though unpreferred, method of incorporating the titanic oxid in the printers' inks, or colors, instead of, as above, precipitating, or fixing, the organic coloring matter upon the white titanic oxid, or the "composite titanic oxid pigment" as a base, we precipitate the organic coloring matter in pure form and subsequently grind the product with the desired amount of the titanic oxid, or of the composite titanic oxid pigment and then, as before, incorporate the resulting mixture with the constituents of the printers' ink or colors, or we mix, or grind, together a quantity of an inorganic pigment, or color, with a titanic oxid pigment and then, as before, incorporate the resulting mixture with the constituents of the printers' inks, or colors.

The preparations of isolated titanic oxid preferable for our above purposes are those in which it is had in such amorphous, substantially, pure, fine, smooth, powdered form as are obtainable by aid of such procedures as are described in Letters Patent granted to Auguste J. Rossi and Louis E. Barton, Nos. 1,106,406, 1,106,407, 1,106,408, 1,106,409, 1,106,410, dated August 11, 1914, No. 1,166,547, dated January 4, 1916, No. 1,171,542, dated February 15, 1916, and Nos. 1,196,029, 1,196,030, 1,196,031, dated August 29, 1916; and also to Louis E. Barton No. 1,189,229, dated July 4, 1916, No. 1,201,541, dated October 16, 1917, and Nos. 1,206,796, 1,206,797, 1,206,798, dated December 5, 1916.

Moreover, as indicated in the example above given, we also find it peculiarly advantageous, or preferable, to use for our said purposes what are known as "composite titanic oxid pigments," in which the titanic oxid is in the form of very minute particles in coalesced combination with, and adherent to, particles, or "carriers" of some other substance, usually a sulfate, and preferably calcium sulfate, such, for example, as produced by precipitation of the said oxid upon such a substance while suspended in an acid solution, preferably a sulfuric acid solution, as per the procedures described in Letters Patent granted to Louis E. Barton, No. 1,155,462, dated October 5, 1915, 1,205,144, dated November 21, 1916, or No. 1,240,405, dated September 18, 1917.

Having now described our invention, what we claim as new and desire to secure by Letters Patent is the following, viz:

1. A printing composition of matter containing a pigment, coloring matter, and titanic oxid.

2. A printing composition of matter containing a pigment, coloring matter, titanic oxid, and an oleoginous vehicle.

3. A printing composition of matter containing a pigment, organic coloring matter, and titanic oxid.

4. Ink containing titanic oxid.

5. A printing composition of matter containing coloring matter and titanic oxid in the form of minute particles coalesced with and adherent to particles of a carrier material.

6. A printing composition of matter containing a pigment, organic coloring matter, and titanic oxid coalesced with another substance.

7. Ink containing titanic oxid in the form of minute particles coalesced with and adherent to particles of a carrier material.

8. The method of improving printable compositions of matter, i. e. printers' inks and colors, which consists in incorporating therewith titanic oxid.

9. The method of improving printable compositions of matter, i. e. printers' inks and colors, which consists in incorporating therewith titanic oxid coalesced with sulfate particles.

LOUIS E. BARTON.
HENRY A. GARDNER.

Witnesses as to Louis E. Barton:
  EURITH GOOLD,
  MATTHEW COWDEN HAYES.
Witnesses as to Henry A. Gardner:
  J. E. JIRDINSTON,
  V. P. VANCE.